March 10, 1964  R. K. NORTON  3,124,782
APPARATUS CONTROL SYSTEM FOR VEHICLES
Filed Nov. 20, 1959
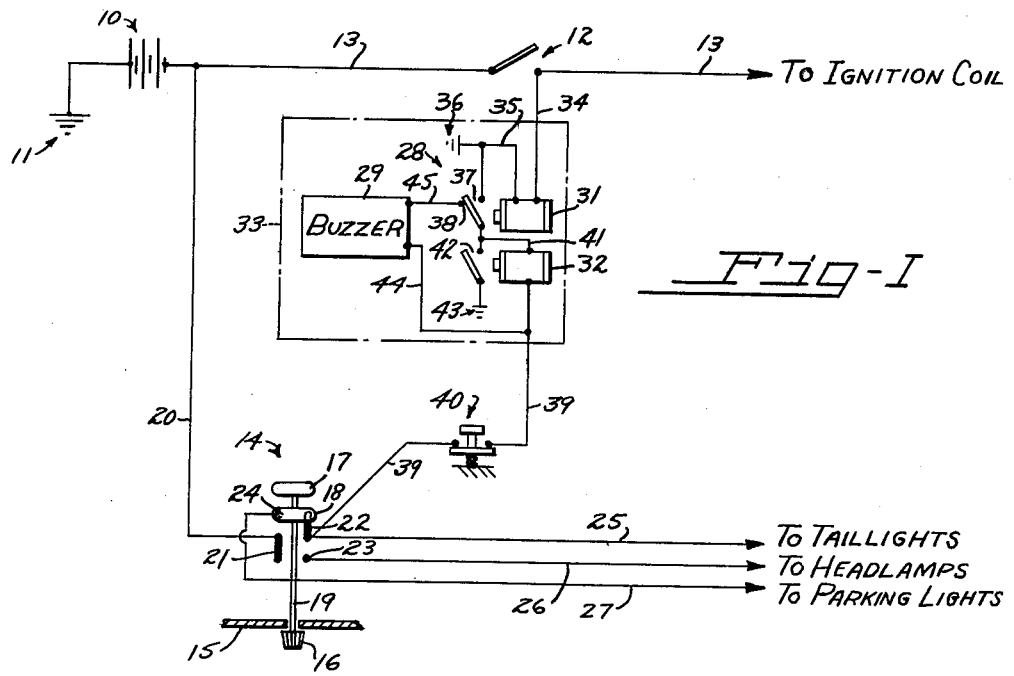
Fig-I
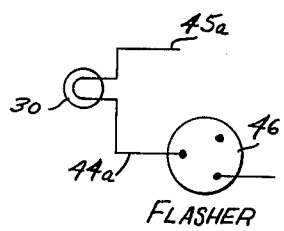
Fig-II
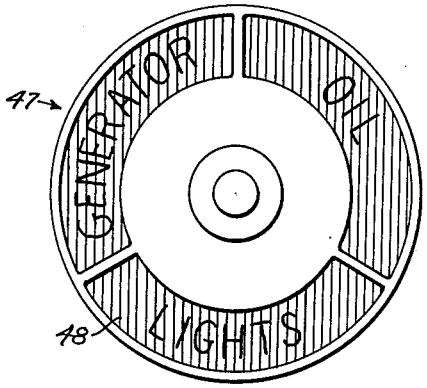
Fig-III
INVENTOR.
Robert K. Norton
BY William Weigl
ATTORNEY United States Patent Office 3,124,782
Patented Mar. 10, 1964

3,124,782
APPARATUS CONTROL SYSTEM FOR VEHICLES
Robert K. Norton, 3024 Cannon Road, Twinsburg, Ohio
Filed Nov. 20, 1959, Ser No. 854,390
2 Claims. (Cl. 340—52)

This invention relates generally to a control system for electrical apparatus of an automobile or similar vehicle. In particular, it relates to a novel control circuit for indicating the presence of electrical current flowing to electrically operated apparatus whenever the ignition switch of the vehicle is opened while the apparatus is energized.

This invention has its primary object to provide a control function or signal whenever a vehicle ignition switch is opened while an electrical apparatus is energized.

It has as a further object the maintenance of the control function or signal until certain prescribed conditions or functions are performed.

Still a further object of the invention is to provide a control circuit for performing the aforementioned objects, which circuit is unaffected by stalling of the vehicle without opening the ignition switch.

Another object is to provide a simple control circuit which is so related to the ignition system and apparatus circuit as to maintain both the ignition system and apparatus circuit unaffected should any portion of the control circuit become inoperative.

A further object of the invention is to enable the apparatus to be energized while the ignition is "off," without affecting the control circuit; more specifically, to enable use of parking lights without operating or otherwise affecting other apparatus.

Still another object of the invention is to provide a control circuit having conections to the ignition system and apparatus circuit, said control circuit being incapable of performing its control function or signal unless both the ignition system and apparatus switch are energized at the time the ignition switch is opened, and said control circuit becoming inactive when certain prescribed conditions or functions are performed and remaining inactive until both the ignition system and apparatus switch are subsequently energized at the same time.

More specifically, it is an object of the preferred form of this invention to signal that vehicle lights are illuminated at the time an ignition switch is opened, said signal being deactivated when the lights are extinguished, and remaining deactivated until the ignition switch is again closed and the lights again turned on, regardless of the order in which the last two functions occur.

Other objects and advantages will be apparent from the following description, in which reference is made to the accompanying drawings:

In the drawings:

FIG. I is a schematic wiring diagram of the control circuit of my invention,

FIG. II is a schematic view of a modification of a selected portion of FIG. I, and, FIG. III is an elevational view of an indicator mounted on a vehicle dashboard, which indicator is adapted for use with the form of my invention shown in FIG. II.

Referring now to the drawings, a portion of a conventional ignition system of an automotive or similar vehicle includes a battery 10 grounded at 11 and having an ignition switch 12 in a line 13. The switch 12 may be conventional, and is preferably of the key-operated type. An apparatus circuit, illustrated herein as the external lighting circuit of the vehicle includes a light switch 14 of any conventional type, mounted on a dashboard 15. The switch is shown as having a push-pull knob 16, a pair of contact blades 17 and 18, and a stem 19 which carries and insulates the contact blades 17 and 18 from each other. The switch 14 has a hot line 20 leading from the battery 10 to a terminal 21. The switch 14 also has terminals 22, 23 and 24 to which are connected lines 25, 26 and 27 leading to taillights, headlamps, and parking lights respectively of the vehicle. The switch has three positions; the one illustrated in which all lights are off, a second position in which contact blade 18 connects terminals 21 and 22 and contact blade 17 connects terminals 22 and 24 to illuminate the taillights and front parking lights, and a third position in which contact blade 18 connects terminals 21 and 23 and contact blade 17 connects terminals 21 and 22 to illuminate the taillights and headlamps or headlights. It will be noticed that the terminal 22 for the taillights is connected to lead 20 in both of the latter two positions.

For the purpose of indicating that the lights are "on" when the ignition switch 12 is opened, if such is the case, a control circuit 28 is provided to cause a buzzer 29 to buzz or a warning light 30 (FIG. II) to come on, or both. The control circuit includes a first relay 31 and a hold-in relay 32. Both relays are preferably mounted, together with the buzzer 29, in a box or housing 33 which may be mounted on the firewall of the vehicle.

Whenever the ignition switch 12 is closed, the coil of relay 31 is energized through leads 34 and 35 to ground 36. At such time, normally open contacts 37 of the relay 31 close, and normally closed contacts 38 of the relay open. If, at the time relay 31 is energized, the light switch 14 is in the open condition shown, the operation of relay 31 will have no affect. If the light switch is in the second or third position previously described, however, i.e., a condition in which the terminal 22 is "hot," the coil of the hold-in relay 32 will be energized from a lead 39 connected to the terminal, through a closed disconnect switch 40, a lead 41, the now-closed contacts 37 to the ground 36. Energization of the hold-in relay coil closes normally open hold-in contacts 42 one side of which is connected to ground at 43. Relay 32 is therefore held energized through both grounds 36 and 43. This condition, in which both relays 31 and 32 are energized, exists only when both the ignition switch 12 and light switch 14 are closed at the same time. If the light switch 14 is opened with the ignition switch 12 closed, the circuit to hold-in relay 32 will be broken, dropping out relay 32. Subsequent opening of ignition switch 12 will merely de-energize relay 31.

If, however, with both switches closed and both relays energized, the ignition switch 12 is opened, a warning signal will be operated by the control circuit 28 to indicate that the lights are "on." The warning will come from either the buzzer 29 or light 30, or both if it is desired to provide both a visual and audible warning. The buzzer 29 is energized in the following fashion when the ignition switch 12 is opened while light switch 14 is closed. Relay 31 will be deenergized by opening of the ignition switch 12 causing contacts 37 to open and contacts 38 to close. Opening of contacts 37 has no affect on hold-in relay 32 since its own contacts 42 connect it to ground 43. Closing of contacts 38, however, activates buzzer 29 through lead 39, a lead 44, a lead 45, the contacts 38 and 42, and ground 43. The buzzer will operate continuously until hold-in relay 32 is dropped out, either by actually turning off the light switch 14 or by momentarily opening disconnect switch 40. The switch 40 may be desirable for deactivating the warning signal if it is wished to keep the lights "on" for parking for example. Or, the switch 40 may be omitted and the same effect obtained by merely turning the lights "off," and then "on" again. When turned "off," contacts 42 of the relay 32 open, and prevent subsequent closing of the light switch 14 from affecting the elements of the control circuit 28. The control circuit for operating the buzzer cannot be energized fully again unless both the light switch 14 and ignition switch 12 are closed, and the switch 12 opened first.

It is immaterial in which order the switches 12 and 14 are closed. If switches 12 and 14 are closed in that order, relays 31 and 32 will close in the same order. If switch 14 is closed before switch 12 is closed, nothing will occur on the closing of light switch 14, but relays 31 and 32 will be energized in that order when ignition switch 12 is subsequently energized.

One important feature of my invention is that the ignition can never be started with a simultaneous drain on the battery from the lights, unless the operator either consciously turns "on" his lights first and has knowledge of the drain, or has turned his parking lights "on" after deactivating a previous signal to turn them "off." Furthermore, if parking lights are consciously left "on" while parking on a dark street for example, the next time the operator starts the vehicle the control circuit will again be set up to provide the warning at the next stop when the ignition switch 12 is opened.

Referring now to FIG. II, the light 30 may be positioned in lines 44a and 45a corresponding to lines 44 and 45 of the FIG. I modification. If desired, a flasher 46 may be provided to make the light 30 intermittent rather than continuous.

I prefer to mount my light behind a dashboard indicator 47 which may have a red cover which shows up brightly when illuminated from behind. The indicator may be a conventional one which indicates if the oil pressure is too low or generator is not generating. In addition, a panel 48 may be provided to light up bright red when the light 30, which is positioned behind the panel, comes "on." The letters Lights are preferably provided on the panel.

Various modifications may be made without departing from the spirit and scope of the claims.

Having described my invention, I claim:

1. In an automotive vehicle having a battery, an ignition system, an exterior lighting system, and control circuitry connected to said battery for each said system including an ignition switch for the ignition system and a light switch for the lighting system;

(a) a first relay having a coil, a set of normally open contacts, and a set of normally closed contacts;
   (b) a first circuit having electrical conductors connecting in series said battery, the ignition switch, and the coil of the first relay;
   (c) a hold-in relay having a coil and a set of normally open contacts;
   (d) a second circuit for operating said hold-in relay including in series said battery, the light switch, the coil of the hold-in relay, and the normally open contacts of the first relay;
   (e) a hold-in circuit for said hold-in relay including in series the light switch and the normally open contacts of the hold-in relay;
   (f) electrically operated means for signalling an energized condition of said lighting system whenever said ignition switch is operated to deenergize both the ignition system and said first relay; and
   (g) a fourth circuit having electrical conductors connecting in series said battery, said light switch, said signalling means, the normally closed contacts of said first relay, and the contacts of said hold-in relay, for operating said signalling means when said fourth circuit is closed.

2. The invention set forth in claim 1 wherein said hold-in circuit includes a normally-closed, manually operable disconnect switch for deenergizing said hold-in relay and said signalling means without affecting an energized condition of the lighting system.

References Cited in the file of this patent
UNITED STATES PATENTS

| | | |
|---|---|---|
| 2,773,249 | De Santis | Dec. 4, 1956 |
| 2,780,797 | Gooding | Feb. 5, 1957 |
| 2,788,514 | Schmitt | Apr. 9, 1957 |
| 2,799,843 | Savins | July 16, 1957 |